(12) United States Patent
Mizusaki et al.

(10) Patent No.: US 11,079,634 B2
(45) Date of Patent: Aug. 3, 2021

(54) LIQUID CRYSTAL DISPLAY DEVICE AND METHOD FOR MANUFACTURING SAME

(71) Applicant: SHARP KABUSHIKI KAISHA, Sakai (JP)

(72) Inventors: Masanobu Mizusaki, Sakai (JP); Hiroshi Tsuchiya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 137 days.

(21) Appl. No.: 16/079,050

(22) PCT Filed: Feb. 17, 2017

(86) PCT No.: PCT/JP2017/005795
§ 371 (c)(1),
(2) Date: Aug. 22, 2018

(87) PCT Pub. No.: WO2017/145917
PCT Pub. Date: Aug. 31, 2017

(65) Prior Publication Data
US 2019/0064606 A1    Feb. 28, 2019

(30) Foreign Application Priority Data
Feb. 24, 2016  (JP) .............. JP2016-033541

(51) Int. Cl.
*G02F 1/1337*  (2006.01)
*C08J 5/18*  (2006.01)

(52) U.S. Cl.
CPC .......... *G02F 1/133788* (2013.01); *C08J 5/18* (2013.01); *G02F 1/133711* (2013.01);
(Continued)

(58) Field of Classification Search
CPC ......... G02F 1/133788; G02F 1/133711; G02F 1/133723; G02F 2001/133715; C08J 5/18; Y10T 428/1023; Y10T 428/1014
See application file for complete search history.

(56) References Cited
U.S. PATENT DOCUMENTS 8,252,202 B2 * 8/2012 Nakata ................ C09K 19/42
  252/299.01
2011/0007254 A1 * 1/2011 Terashita .......... G02F 1/133711
  349/123
(Continued)

FOREIGN PATENT DOCUMENTS

CN    102272670 A    12/2011
JP    2009-173792 A   8/2009
WO    2012-029589 A1  3/2012

*Primary Examiner* — Anthony J Frost
(74) *Attorney, Agent, or Firm* — ScienBiziP, P.C.

(57) ABSTRACT

The present invention provides a liquid crystal display device that can sufficiently prevent crystallization of a liquid crystal material at low temperatures, and thereby has high response performance suitable for applications such as HMDs. The liquid crystal display device includes: paired substrates; a liquid crystal layer held between the substrates; and a photo-alignment film disposed on a surface facing the liquid crystal layer of at least one of the substrates, the liquid crystal layer containing a liquid crystal material that has a nematic-isotropic phase transition temperature of 75° C. or lower and a nematic phase temperature range narrower than 100° C., the photo-alignment film containing a polymer, the polymer and/or another component of the photo-alignment film containing a hydrophobic group.

8 Claims, 3 Drawing Sheets

(52) U.S. Cl.
CPC .. *G02F 1/133723* (2013.01); *C09K 2323/023* (2020.08); *C09K 2323/027* (2020.08); *G02F 1/133715* (2021.01)

(56) References Cited

U.S. PATENT DOCUMENTS

| | | |
|---|---|---|
| 2012/0013837 A1 | 1/2012 | Terashita et al. |
| 2012/0114879 A1* | 5/2012 | Hatanaka .............. C09D 133/10 428/1.2 |
| 2013/0162920 A1 | 6/2013 | Terashita et al. |
| 2014/0173893 A1* | 6/2014 | Nagao ............... G02F 1/133788 29/829 |

* cited by examiner

LIQUID CRYSTAL DISPLAY DEVICE AND METHOD FOR MANUFACTURING SAME

TECHNICAL FIELD

The present invention relates to liquid crystal display devices and methods for manufacturing the liquid crystal display devices. The present invention specifically relates to a liquid crystal display device suitable for head mounted displays (HMDs) and a method for manufacturing the liquid crystal display device.

BACKGROUND ART

Displays such as liquid crystal display devices have rapidly spread and have been employed widely not only for televisions but also for applications such as electronic book readers, digital photo frames, industrial appliances, personal computers (PCs), tablet PCs, smartphones, and HMDs. Liquid crystal display devices are desired to have various performance characteristics in these applications, and thus various liquid crystal display modes have been developed.

Examples of the liquid crystal display modes include modes in which liquid crystal molecules are aligned in a direction substantially parallel to the main surfaces of the substrates with no voltage applied, such as the in-plane switching (IPS) mode and the fringe field switching (FFS) mode (hereinafter, such modes are also referred to as horizontal alignment modes). The examples also include modes in which liquid crystal molecules are aligned in a direction substantially perpendicular to the main surfaces of the substrates with no voltage applied, such as the vertical alignment (VA) mode (hereinafter, such modes are also referred to as vertical alignment modes). For alignment control of these liquid crystal molecules, use of alignment films has been suggested.

For example, Patent Literature 1 discloses a liquid crystal display panel that has a configuration in which a liquid crystal layer containing liquid crystal molecules is interposed between a pair of substrates, and includes a photo-alignment film on a surface of at least one substrate on a liquid crystal layer side, wherein in the photo-alignment film, a film formed using an alignment film material containing a polymer is subjected to an alignment treatment by photo-irradiation, the polymer including a first constituent unit exhibiting a property of controlling alignment of the liquid crystal molecules by photo-irradiation as an essential constituent unit; the first constituent unit exhibits the property of controlling alignment of the liquid crystal molecules by at least one photo-chemical reaction selected from a photo-cross-linking reaction and a photo-isomerization reaction; in the polymer, an introduction ratio of a second constituent unit, which exhibits the property of controlling alignment of the liquid crystal molecules without photo-irradiation is 0 mol % or more on the basis of 100 mol % of a total of the first constituent unit and the second constituent unit; the photo-alignment film includes the film formed using the alignment film material and a film formed from a material other than the alignment film material, a surface portion of the photo-alignment film on a liquid crystal layer side is essentially composed of the film formed using the alignment film material, and in a case where a ratio of a solid-content of the material other than the alignment film material to 100 weight % of a solid-content of the alignment film material and the material other than the alignment film material is set to a modification rate, when the introduction ratio of the second constituent unit is equal to or more than 0 mol % and less than 6 mol %, the modification rate is 0 to 85 weight %, and when the introduction ratio is 6 mol % or more, the modification rate is 0 to 90 weight %.

Patent Literature 2, for example, discloses an alignment film comprising: an aligned, cured product of a component (I) concentrated on the surface of the alignment film; and a component (II), the alignment film obtained by photo-aligning the component (I) in a film of a composition containing the component (I) and the component (II) and heat-curing the component (I), wherein the component (I) has a thermosetting property and a photo-aligning property with which its molecules are aligned in one direction upon being irradiated with light, and the component (II) constitutes the film without the heat for heat-curing the component (I).

CITATION LIST

Patent Literature

Patent Literature 1: WO 2012/029589
Patent Literature 2: JP 2009-173792 A

SUMMARY OF INVENTION

Technical Problem

The invention disclosed in Patent Literature 1 relates to a photo-alignment film material used to enhance the alignment stability of liquid crystal molecules and improve the alternating current (AC) image sticking resistance.

The invention disclosed in Patent Literature 1 utilizes a copolymer having a monomer unit with no photo-functional group (photo-aligning functional group) to enhance the alignment stability. Patent Literature 1 shows the structures represented by the formulas (2-1) to (2-13) therein as specific examples of the functional group in the monomer unit with no photo-functional group. FIG. 1 of Patent Literature 1 shows a copolymer having a monomer unit with a photo-functional group and a monomer unit with no photo-functional group.

The invention disclosed in Patent Literature 2 relates to an alignment film material that aligns liquid crystal molecules in a direction substantially parallel to a main surface of a substrate with no voltage applied (hereinafter, such a material is also referred to as a horizontal photo-alignment film material). A horizontal photo-alignment film material is a polyamic acid-based photo-alignment film material containing an azobenzene group. The polyamic acid-based photo-alignment film material specifically has a monomer unit derived from a diamine represented by the formula (1-1) or (1-2) in Patent Literature 2.

In liquid crystal display devices desired to have high response performance such as liquid crystal display devices for HMDs, the liquid crystal material in the liquid crystal layer preferably has as low a viscosity as possible (for example, has a viscosity of 70 mPa·s or lower (20° C.)). The most effective way to minimize the viscosity of a liquid crystal material is to set the liquid crystal (nematic) phase temperature range of the liquid crystal material to the narrowest, which means to lower the liquid crystal-isotropic phase transition temperature (phase transition point) (Tni) and increase the solid (crystalline)-liquid crystal (nematic) phase transition temperature to the highest possible. Typically, the viscosity of the liquid crystal material in liquid crystal display devices for HMDs is reduced by setting the liquid crystal phase temperature range to narrower than 100°

C., with the use temperature (20° C.) of liquid crystal display devices included. In order to reduce the viscosity of a liquid crystal material, the molecular weight of liquid crystal molecules in the liquid crystal material is preferably brought to the minimum possible (e.g., 300 or less). Reduction in molecular weight of liquid crystal molecules, however, is likely to cause crystallization (solidification) of the liquid crystal material at low temperatures. One possible main cause of the crystallization is the strong intermolecular interaction between the liquid crystal molecules in the liquid crystal material. Patent Literatures 1 and 2 fail to disclose use of such liquid crystal.

There has been also a demand for contrast ratio increase in horizontal electric field modes such as the IPS mode and the FFS mode. For an increase in contrast ratio, photo-alignment is more advantageous than rubbing because photo-alignment can control liquid crystal molecules in one direction with a higher degree of precision than rubbing. Liquid crystal molecules, however, exhibit stronger interaction between them as they are aligned with a higher degree of precision, which is likely to be a cause of crystallization at low temperatures. A common conventional photo-alignment film includes two layers, namely a base polymer layer with no photo-functional group and a polymer layer with a photo-functional group.

The present invention has been made in view of the above current state of the art, and aims to provide a liquid crystal display device that can sufficiently prevent crystallization of the liquid crystal material at low temperatures and exhibit high response performance suitable for applications such as HMDs.

Solution to Problem

The intermolecular interaction between the alignment film material and liquid crystal molecules in the liquid crystal layer at low temperatures (e.g., −20° C. or lower) is increased such that the liquid crystal (nematic) phase is made stable.

The liquid crystal material is crystallized at low temperatures (−20° C. or lower) since the interaction between liquid crystal molecules is strong. In particular, crystallization is presumed to more easily occur as the p orbital electron interaction becomes stronger between phenyl groups, phenylene groups, or fluorine-substituted phenyl or phenylene groups in the liquid crystal molecules. In order to prevent the liquid crystal material from crystallizing at low temperatures, the p orbital electron interaction between phenyl groups or phenylene groups is preferably weakened. One possible method thereof is to weaken the interaction between liquid crystal molecules at the alignment film-liquid crystal layer interface using an alignment film material. The present inventors made studies on this method, and arrived at the following techniques (1) to (4) utilizing a hydrophobic group. The techniques (1) to (4) may be used alone or in combination with each other.

(1) Hydrophobic and highly flexible groups (e.g., saturated or unsaturated linear or cyclic groups derived from an aliphatic compound (aliphatic groups), such as alkyl groups or cholesteryl groups) are distributed on a surface of an alignment film. Specifically, a hydrophobic group such as a hydrophobic side chain is introduced as a copolymer unit into an alignment-controlling polymer (photo-alignment film). Examples of the hydrophobic group include aliphatic groups such as alkyl groups and alicyclic groups.

(2) A low-molecular-weight additive (e.g., surfactant, silane-coupling agent) containing a hydrophobic group such as an alkyl group or an alicyclic group is introduced to a surface of an alignment film.

(3) A polymer containing a hydrophobic group is introduced to a surface of an alignment film, separately from an alignment-controlling polymer (e.g., polymer containing a photo-functional group).

(4) A monomer containing a hydrophobic group is introduced into an alignment film material, and polymerized by heat or light application, so that a polymer containing a hydrophobic group is introduced to a surface of an alignment film separately from an alignment-controlling polymer (e.g., polymer containing a photo-functional group).

The present inventors arrived at a solution to the problem described above using these techniques, thereby completing the present invention.

In other words, one aspect of the present invention may be a liquid crystal display device including: paired substrates; a liquid crystal layer held between the substrates; and a photo-alignment film disposed on a surface facing the liquid crystal layer of at least one of the substrates, the liquid crystal layer containing a liquid crystal material that has a nematic-isotropic phase transition temperature of 75° C. or lower and a nematic phase temperature range narrower than 100° C., the photo-alignment film containing a polymer, the polymer and/or another component of the photo-alignment film containing a hydrophobic group.

(Difference from the Invention Disclosed in Patent Literature 1)

The present invention has been made to avoid crystallization of a liquid crystal material at low temperatures in a liquid crystal display device having high response performance, not to deal with image sticking problems such as AC image sticking. A key feature of the present invention is therefore the characteristics of the liquid crystal material. Specifically, the present invention employs a liquid crystal material having a Tni of 75° C. or lower and a nematic phase temperature range narrower than 100° C. The object of the present invention differs from the object of the invention disclosed in Patent Literature 1. The invention disclosed in Patent Literature 1 is therefore silent as to the characteristics of the liquid crystal material.

The problem to be solved by the present invention is that a liquid crystal material is likely to crystallize at low temperatures, and thus the present invention relates to a combination of an alignment film material and a liquid crystal material to prevent crystallization. A feature of the present invention is to introduce a specific functional group into an alignment film, with the type of the applicable copolymer not limited. In particular, the technique of adding a monomer containing an aliphatic group such as an alkyl group into the alignment film material and thermally polymerizing the monomer to introduce the aliphatic group is an important problem-solving technique in the present invention. Patent Literature 1 fails to disclose this technique.

(Difference from the Invention Disclosed in Patent Literature 2)

The present invention differs from the invention disclosed in Patent Literature 2 in that the present invention specifies the liquid crystal material so as to avoid liquid crystal crystallization at low temperatures. The present invention provides a solution to the problem that the liquid crystal material crystallizes at low temperatures in a liquid crystal display device having high response performance. A key feature of the present invention is therefore the characteristics of the liquid crystal material. Specifically, the present invention employs a liquid crystal material having a Tni of 75° C. or lower and a nematic phase temperature range narrower than 100° C. Patent Literature 2 is silent as to these characteristics of the liquid crystal material. Another significant difference is that, as described below, the present invention includes adding another polymer (in particular, a polyvinyl material) to the alignment film or adding a monomer and a polymerization initiator and polymerizing the monomer added.

The problem to be solved by the present invention is that a liquid crystal material is likely to crystallize at low temperatures, and thus the present invention relates to a combination of an alignment film material and a liquid crystal material to prevent crystallization. A feature of the present invention is to introduce a specific functional group into the alignment film, with the type of the applicable copolymer not limited. In particular, the technique of adding a monomer containing an aliphatic group such as an alkyl group to the alignment film material and thermally polymerizing the monomer to introduce the aliphatic group is effective in terms of the following points.

(1) When an aliphatic group such as an alkyl group is introduced into a polymer itself constituting the photo-alignment film, the conformation of the polymer with the aliphatic group introduced therein changes in the photo-alignment film. This affects the alignment of liquid crystal molecules in the liquid crystal layer. In contrast, the technique of the present invention can retain the conformation of the polymer in the photo-alignment film, reducing or avoiding crystallization of the liquid crystal material at low temperatures without affecting the stability of the liquid crystal alignment.

(2) The resulting vinyl polymer is more likely to interact with the liquid crystal material than a polyamic acid or a polysiloxane, and is therefore effective in reducing or avoiding crystallization of the liquid crystal material at low temperatures.

Advantageous Effects of Invention

The present invention can sufficiently prevent crystallization of a liquid crystal material at low temperatures in a liquid crystal display device having high response performance suitable for applications such as HMDs.

DESCRIPTION OF EMBODIMENTS

Figure 1:
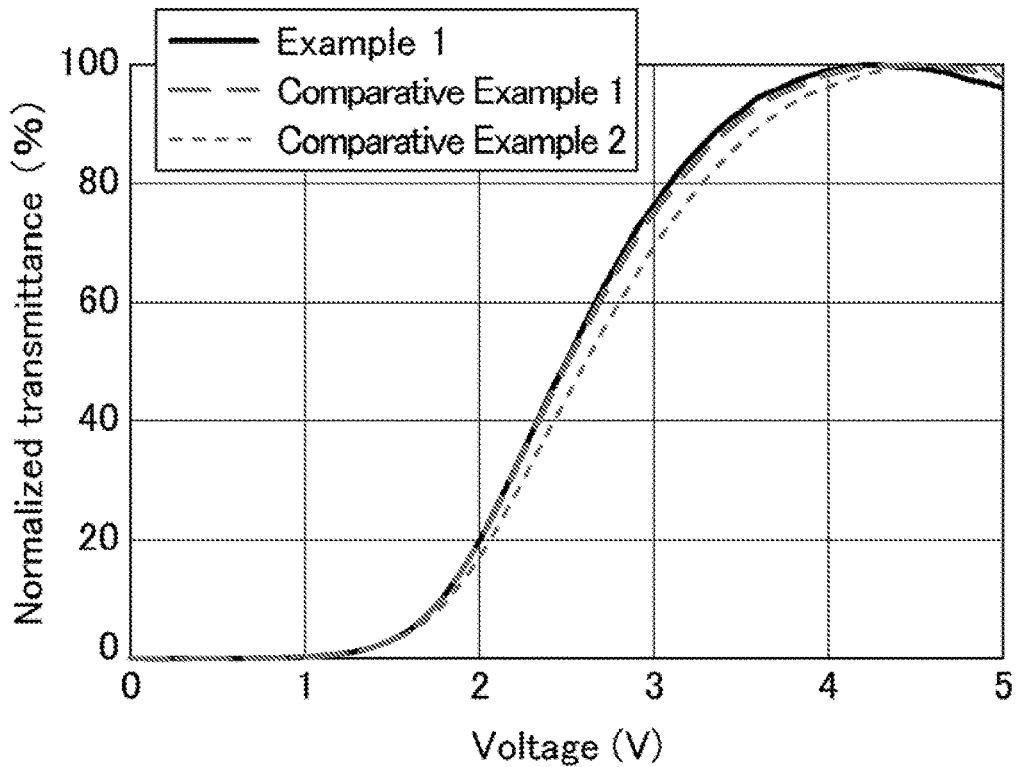
FIG. 1 is a graph showing the normalized transmittance (%) versus voltage (V) in liquid crystal display devices of Example 1 and Comparative Examples 1 and 2.

The present invention is described in more detail below based on the following embodiment with reference to the drawings. The embodiment, however, is not intended to limit the scope of the present invention. The configurations of the embodiment may appropriately be combined or modified within the spirit of the present invention.

Tni herein is determined by visually observing the liquid crystal state or the isotropic state while varying the temperature using a device such as one from Mettler.

The nematic phase temperature range is measured in a similar manner by visually observing the liquid crystal state or the isotropic state while varying the temperature using a device such as one from Mettler.

These temperatures can also be determined by a technique of determining the temperature at which phase transition occurs using a differential scanning calorimeter (DSC).

The mode herein in which liquid crystal molecules are aligned in a direction substantially parallel to a main surface of a substrate with no voltage applied is also referred to as a horizontal alignment mode. The expression "substantially parallel" means that, for example, the pre-tilt angle of liquid crystal molecules is 0° or greater and 5° or smaller from the main surface of the substrate. The mode in which liquid crystal molecules are aligned in a direction substantially perpendicular to a main surface of a substrate with no voltage applied is also referred to as a vertical alignment mode. The expression "substantially perpendicular" means that, for example, the pre-tilt angle of liquid crystal molecules is 85° or greater and 90° or smaller from the main surface of the substrate. The room temperature is 15° C. or higher and 40° C. or lower, unless otherwise stated.

The chemical bond as used herein usually means a covalent bond.

The concept of the present invention is applicable to both horizontal alignment mode liquid crystal display devices and vertical alignment mode liquid crystal display devices, but is preferably applied to horizontal alignment mode liquid crystal display devices.

A photo-alignment film containing a polymer whose main chain has a polyamic acid structure is also referred to as a polyamic acid-based photo-alignment film.

Preferred examples of the polymer whose main chain has a polyamic acid structure include those having a polyamic acid structure represented by the following formula (1).

[Chem. 1]

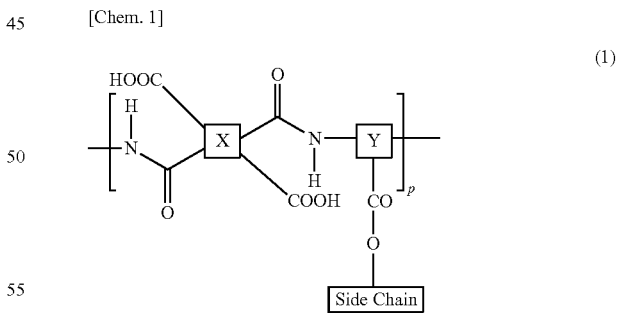

In the formula (1), p shows the degree of polymerization and is an integer of 1 or greater, preferably 10 or greater.

In the formula (1), at least one of X, Y, and Side Chain contains a photo-functional group. In the case where X contains a photo-functional group, X is preferably a tetravalent group represented by any one of the following formulas (2-1) to (2-4), for example. These groups can be used for both horizontal photo-alignment films, which align liquid crystal molecules in a direction substantially parallel to the surfaces of the film, and vertical photo-alignment films, which align liquid crystal molecules in a direction substantially perpendicular to the surfaces of the film.

[Chem. 2-1]

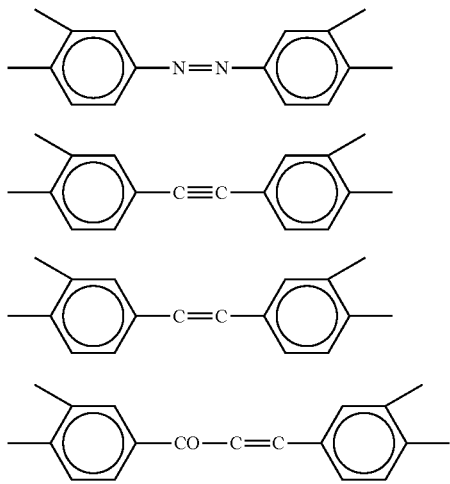

(2-1)
(2-2)
(2-3)
(2-4)

In the formula (1), in the case where X contains no photo-functional group, X may be a tetravalent group represented by any one of the following formulas (2-5) to (2-16). These groups can be used for both horizontal alignment films and vertical alignment films.

[Chem. 2-2]

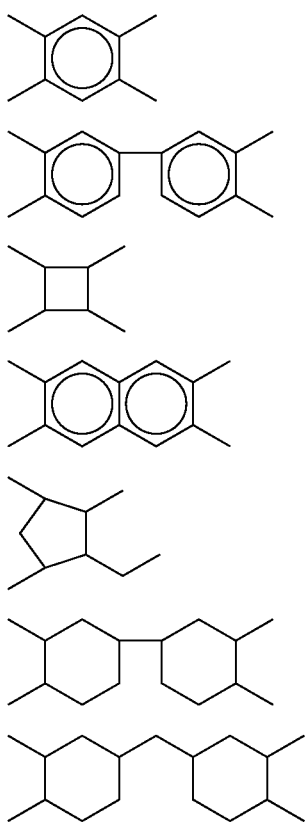

(2-5)
(2-6)
(2-7)
(2-8)
(2-9)
(2-10)
(2-11)

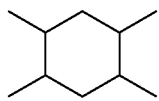

(2-12)

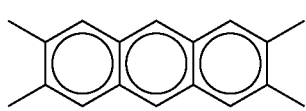

(2-13)

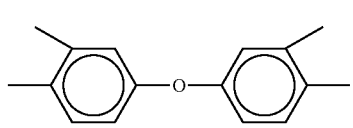

(2-14)

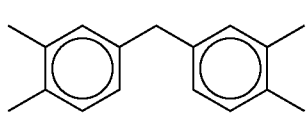

(2-15)

(2-16)

In the formula (1), in the case where Y contains a photo-functional group, Y is preferably a tetravalent group represented by any one of the following formulas (3-1) to (3-8), for example. These groups can be used for both horizontal photo-alignment films and vertical photo-alignment films.

[Chem. 3-1]

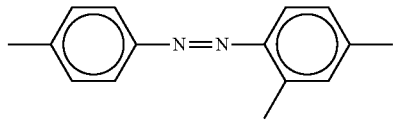

(3-1)

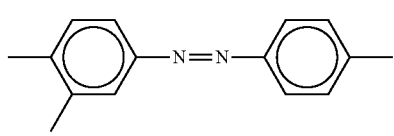

(3-2)

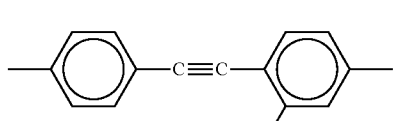

(3-3)

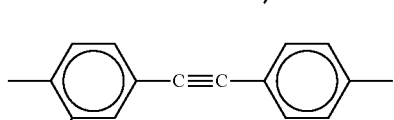

(3-4)

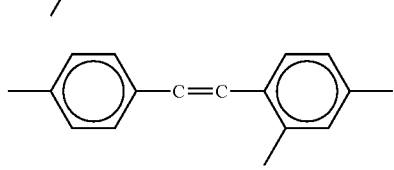

(3-5)

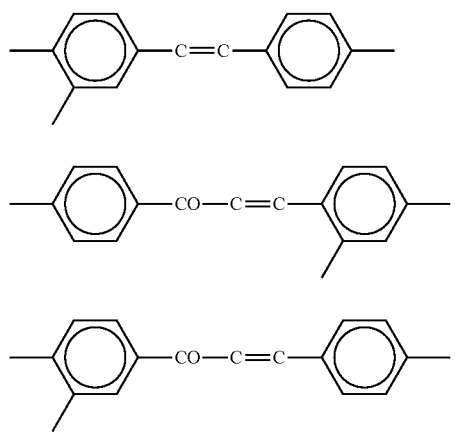

(3-6)

(3-7)

(3-8)

In the formula (1), in the case where Y contains no photo-functional group, Y may be a trivalent group represented by any one of the following formulas (3-9) to (3-24). These groups can be used for both horizontal alignment films and vertical alignment films.

[Chem. 3-2]

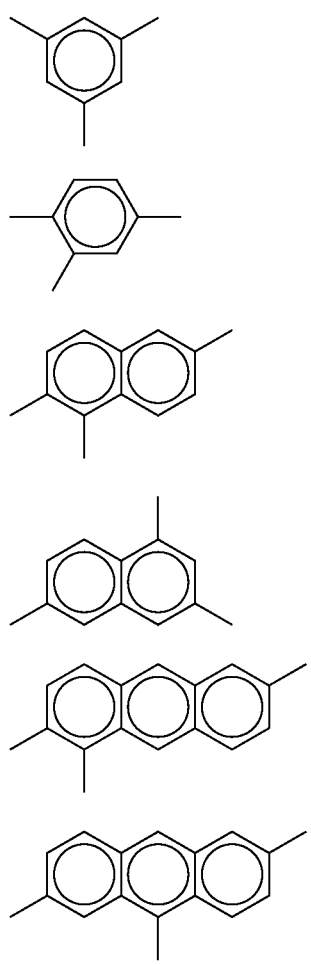

(3-9)
(3-10)
(3-11)
(3-12)
(3-13)
(3-14)

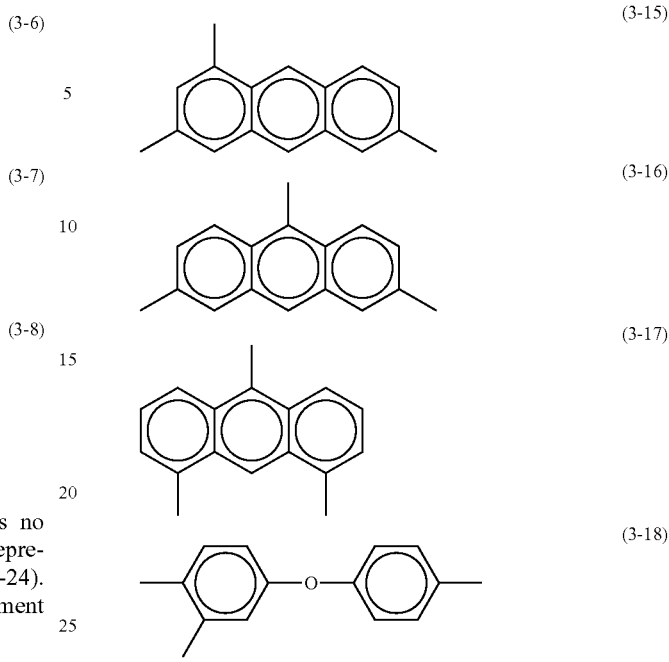

(3-15)
(3-16)
(3-17)
(3-18)
(3-19)
(3-20)
(3-21)
(3-22)
(3-23)
(3-24)

In the formula (1), Side Chain is preferably a photo-functional group. Preferred examples of the photo-functional group include a monovalent group represented by any one of the following formulas (4-1) to (4-5). Groups represented by the formulas (4-1) and (4-2) are used for horizontal photo-alignment films. Groups represented by any of the formulas (4-3) to (4-5) are used for vertical photo-alignment films.

[Chem. 4-1]

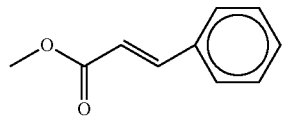
(4-1)

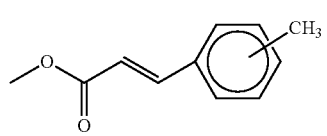
(4-2)

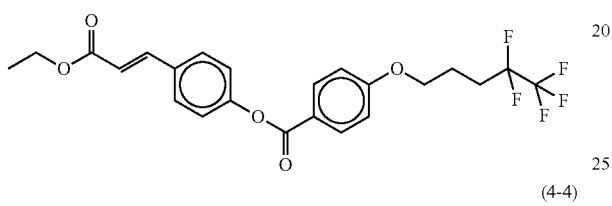
(4-3)

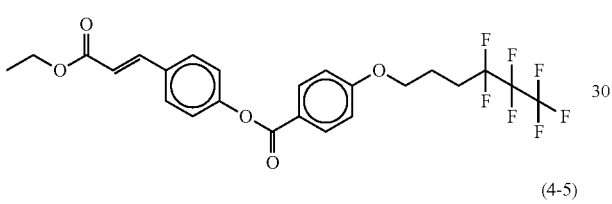
(4-4)

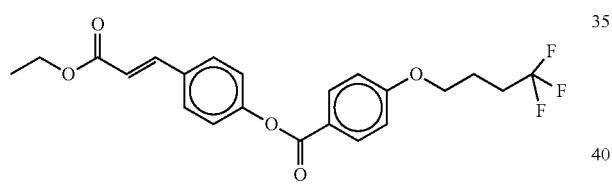
(4-5)

In the formula (1), Side Chain may contain a vertically or horizontally aligning functional group other than the photo-functional group, such as a monovalent group represented by any one of the following formulas (4-6) to (4-13). These groups are used for horizontal alignment films.

[Chem. 4-2]

—H (4-6)

—$CH_3$ (4-7)

—$C_2H_5$ (4-8)

—$CF_3$ (4-9)

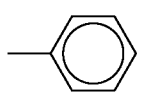
(4-10)

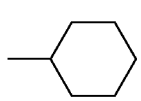
(4-11)

(4-12)

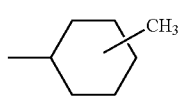
(4-13)

In the formula (1), Side Chain may be a monovalent group represented by any one of the following formulas (4-14) to (4-20). These groups are used for vertical alignment films.

[Chem. 4-3]

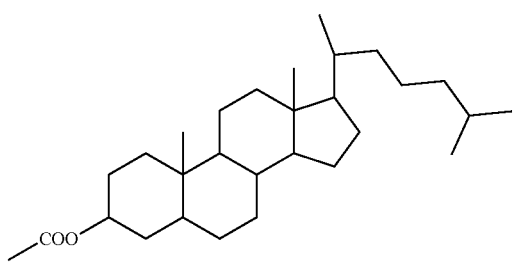
(4-14)

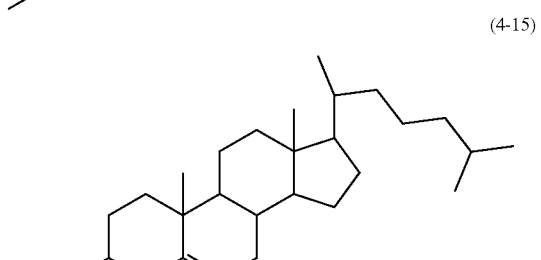
(4-15)

(4-16)

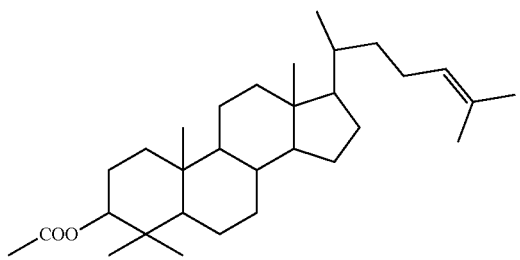
(4-17)

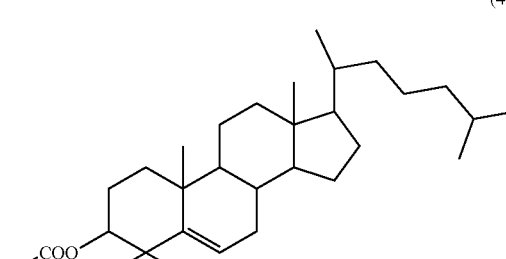

(4-18)
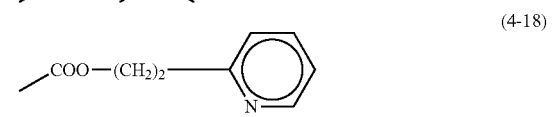

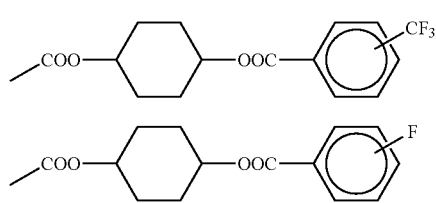
(4-19)

(4-20)

For a high contrast ratio, the alignment film is preferably a photo-alignment film. The alignment film is regarded as a photo-alignment film when at least one of X, Y, and Side Chain is a photo-functional group.

Preferred examples of the polymer whose main chain has a polysiloxane structure include those having a structure represented by the following formula (5) or formula (6).

[Chem. 5]

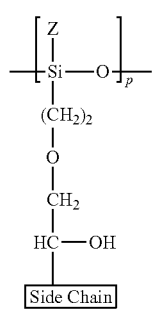

(5)

[Chem. 6]

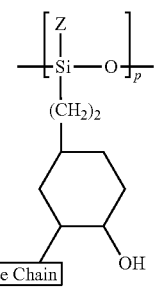

(6)

In the above formulas, p shows the degree of polymerization and is an integer of 1 or greater, preferably 10 or greater; Z represents a methyl, ethyl, methoxy, or ethoxy group; and Side Chain is the same as described above.

The techniques (1) to (4) mentioned above are described below one by one.

(1) Copolymer of Monomer Unit Containing Photo-Functional Group and Monomer Unit Containing Hydrophobic Group The copolymer is preferably, for example, one represented by the following formula (7), the following formula (8), or the following formula (9).

[Chem. 7]

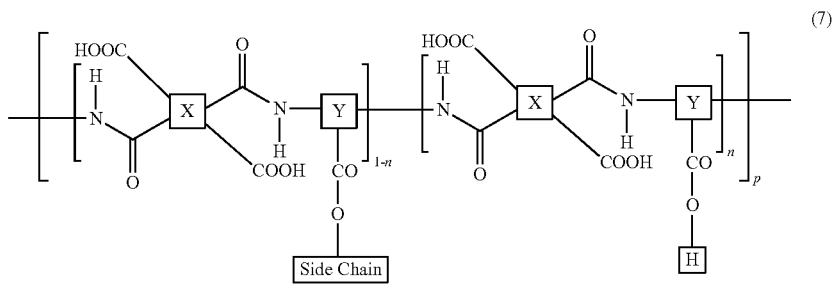

(7)

[Chem. 8]

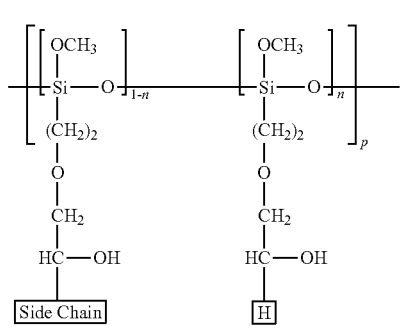

(8)

[Chem. 9]

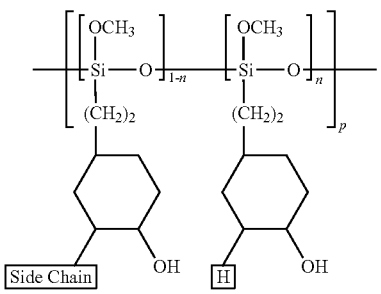

In the formulas, n is any value falling within the range of 0 to 1; the hydrophobic group H represents a C4 or greater alkyl, alkenyl, or aralkyl group or a C4 or greater monovalent monocyclic or polycyclic hydrocarbon group; the alkyl group and the alkenyl group may be linear or branched; at least one hydrogen atom in each of the aralkyl group and the monovalent monocyclic or polycyclic hydrocarbon group may be replaced by a C1 to C8 linear or branched alkyl or alkenyl group; and a —$CH_2$— group in each of the alkyl group, the alkenyl group, or the monovalent monocyclic or polycyclic hydrocarbon group may be replaced by a —O— group, a —CO— group, a —COO— group, or a —OCO— group, unless oxygen atoms neighbor each other.

The monomer unit containing a photo-functional group is represented by the formula (1), the formula (5), or the formula (6), and X, Y, Side Chain, and p are the same as described above. In formulas herein, H surrounded by a solid line represents a hydrophobic group, while H not surrounded by a solid line represents a hydrogen atom.

(2) Introduction of Low-Molecular-Weight Additive (Compound) Containing Hydrophobic Group In the liquid crystal display device of the present invention, the photo-alignment film preferably contains a compound containing a hydrophobic group.

The compound is preferably one represented by, for example, the following formula (10-1):

[Chem. 10-1]

$$S\text{-}A^2\text{-}Z^4\text{-}L^3 \quad (10\text{-}1)$$

wherein S is represented by any one of the following formulas (10-2) to (10-6); $A^2$ represents a divalent hydrocarbon group or a direct bond; the —$Z^4$— group represents a —O— group, a —S— group, a —NH— group, a —CO— group, a —COO— group, an —OCO— group, a —NHCO— group, a —CONH— group, or a direct bond; $L^3$ represents a C4 or greater alkyl, alkenyl, or aralkyl group, or a C4 or greater monovalent monocyclic or polycyclic hydrocarbon group; the alkyl group and the alkenyl group may each be linear or branched; at least one hydrogen atom in each of the aralkyl group and the monovalent monocyclic or polycyclic hydrocarbon group may be replaced by a C1 to C8 linear or branched alkyl or alkenyl group; and a —$CH_2$— group in each of the alkyl group, the alkenyl group, and the monovalent monocyclic or polycyclic hydrocarbon group may be replaced by a —O— group, a —CO— group, a —COO— group, or a —OCO— group unless oxygen atoms neighbor each other,

[Chem. 10-2]

   (10-2)

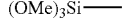   (10-3)

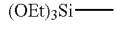   (10-4)

   (10-5)

   (10-6)

wherein Me represents a methyl group and Et represents an ethyl group.

The compound is preferably represented by, for example, the following formula (11-1):

[Chem. 11-1]

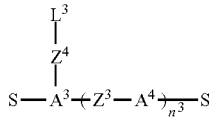   (11-1)

wherein S's are the same as or different from each other and each represented by any one of the following formulas (11-2) to (11-6); $A^3$ represents a trivalent hydrocarbon group; $A^4$ represents a phenylene group; a —$CH_2$— group in each of $A^3$ and $A^4$ may be replaced by a —O— group or a —S— group unless the —$CH_2$— group neighbors another one; a —CH= group in each of $A^3$ and $A^4$ may be replaced by a —N= group unless the —CH= group neighbors another one; a hydrogen atom in each of $A^3$ and $A^4$ may be replaced by a fluorine atom, a chlorine atom, a —CN group, or a C1 to C12 alkyl, alkoxy, alkylcarbonyl, alkoxycarbonyl, or alkylcarbonyloxy group, and at least one of their carbon atoms may be replaced by a silicon atom; the alkyl, alkoxy, alkylcarbonyl, alkoxycarbonyl, or alkylcarbonyloxy group may be linear or branched; the —$Z^3$— group and the —$Z^4$— group are the same as or different from each other and each represent a —O— group, a —S— group, a —NH— group, a —CO— group, a —COO— group, a —OCO— group, a —NHCO— group, a —CONH— group, or a direct bond; $L^3$ represents a C4 or greater alkyl, alkenyl, or aralkyl group or a C4 or greater monovalent monocyclic or polycyclic hydrocarbon group; the alkyl group and the alkenyl group may each be linear or branched; at least one hydrogen atom in each of the aralkyl group and the monovalent monocyclic or polycyclic hydrocarbon group may be replaced by a C1 to C8 linear or branched alkyl or alkenyl group; a —CH$_2$— group in each of the alkyl group, the alkenyl group, and the monovalent monocyclic or polycyclic hydrocarbon group may be replaced by a —O— group, a —CO— group, a —COO— group, or a —OCO— group unless oxygen atoms neighbor each other; and n$^3$ is 0 or 1,

[Chem. 11-2]

  (11-2)

(OMe)$_3$Si—  (11-3)

(OEt)$_3$Si—  (11-4)

Cl$_3$Si—  (11-5)

OCN—  (11-6)

wherein Me represents a methyl group and Et represents an ethyl group.

Examples of the compound include one represented by the following formula (12) or (13).

[Chem. 12]

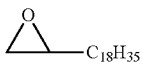  (12)

[Chem. 13]

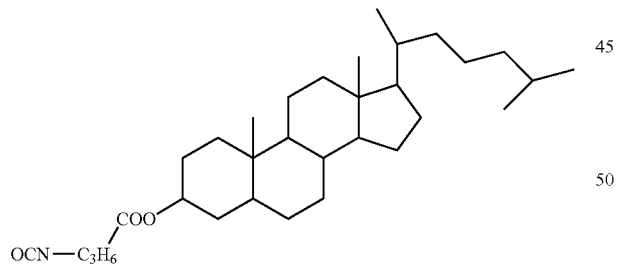  (13)

(3) Blend of Polymer Containing Hydrophobic Group

In the liquid crystal display device of the present invention, the photo-alignment film preferably further contains a polymeric material other than the above polymer, and the polymeric material preferably contains a hydrophobic group.

The polymeric material other than the above polymer is preferably one whose main chain is a polyvinyl chain. Preferred examples thereof include one represented by the following formula (14):

[Chem. 14]

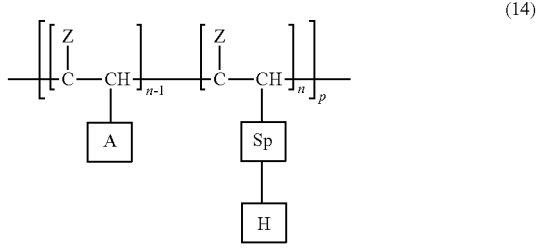  (14)

wherein the hydrophobic group H represents a C4 or greater alkyl, alkenyl, or aralkyl group or a C4 or greater monovalent monocyclic or polycyclic hydrocarbon group; A represents a hydrogen atom, an OH group, a COOH group, or a NH$_2$ group; a -Sp- group represents a —O— group, a —S— group, a —NH— group, a —CO— group, a —COO— group, a —OCO— group, a —NHCO— group, a —CONH— group, or a direct bond; Z represents a hydrogen atom, a CH$_3$ group, or a C$_2$H$_5$ group; p shows the degree of polymerization and is an integer of 1 or greater; and n is any value falling within the range of 0 to 1.

Examples of the polymeric material other than the above polymer include one represented by the following formula (15) or (16).

[Chem. 15]

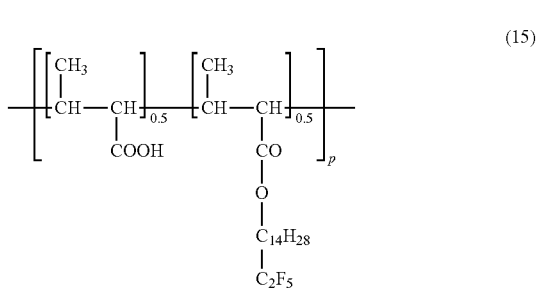  (15)

[Chem. 16]

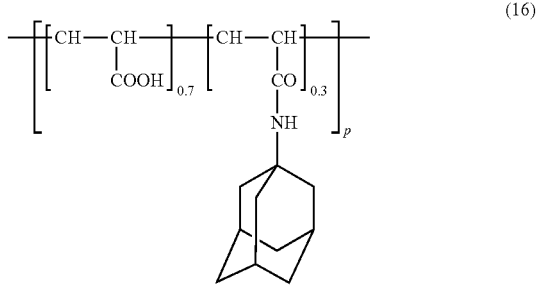  (16)

(4) Introduction and Polymerization of Monomer Containing Hydrophobic Group

In the liquid crystal display device of the present invention, preferably, the photo-alignment film further contains a polymeric material other than the above polymer, the polymeric material contains a hydrophobic group, and the polymeric material is a polymer having a monomer unit derived from a monomer represented by the following formula (17):

[Chem. 17]

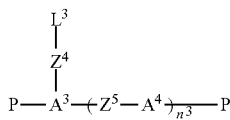

(17)

wherein P's are the same as or different from each other and each represent an acryloyloxy group, a methacryloyloxy group, an acryloylamino group, or a methacryloylamino group; $A^3$ represents a trivalent hydrocarbon group; $A^4$ represents a phenylene group; a —$CH_2$— group in each of $A^3$ and $A^4$ may be replaced by a —O— group or a —S— group unless the —$CH_2$— group neighbors another one; a —CH= group in each of $A^3$ and $A^4$ may be replaced by a —N= group unless the —CH= group neighbors another one; a hydrogen atom in each of $A^3$ and $A^4$ may be replaced by a fluorine atom, a chlorine atom, a CN group, or a C1 to C12 alkyl, alkoxy, alkylcarbonyl, alkoxycarbonyl, or alkylcarbonyloxy group, and at least one of their carbon atoms may be replaced by a silicon atom; the alkyl, alkoxy, alkylcarbonyl, alkoxycarbonyl, or alkylcarbonyloxy group may be linear or branched; the —$Z^4$— group and the —$Z^5$— group are the same as or different from each other and each represent a —O— group, a —S— group, a —NH— group, a —CO— group, a —COO— group, a —OCO— group, a —NHCO— group, a —CONH— group, or a direct bond; $L^3$ represents a C4 or greater alkyl, alkenyl, or aralkyl group or a C4 or greater monovalent monocyclic or polycyclic hydrocarbon group; the alkyl group and the alkenyl group may be linear or branched; at least one hydrogen atom in each of the aralkyl group and the monovalent monocyclic or polycyclic hydrocarbon group may be replaced by a C1 to C8 linear or branched alkyl or alkenyl group; a —$CH_2$— group in each of the alkyl group, the alkenyl group, and the monovalent monocyclic or polycyclic hydrocarbon group may be replaced by a —O— group, a —CO— group, a —COO— group, or a —OCO— group unless oxygen atoms neighbor each other; and $n^3$ is 0 or 1.

(Radical Polymerization Initiator Used in Polymerization)

One aspect of the present invention may be a method for manufacturing the liquid crystal display device of the present invention, the method including: radically polymerizing the monomer using a radical polymerization initiator.

The radical polymerization initiator is preferably an azo-based thermal radical polymerization initiator, more preferably one represented by, for example, the following formula (18).

[Chem. 18]

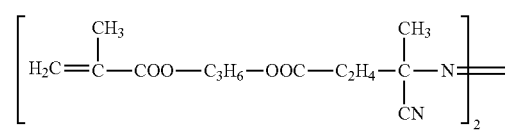

(18)

The proportion of the monomer unit containing a hydrophobic group may fall within the range of 0.01 to 20 mass %, for example, of all polymers (100 mass %).

Hereinafter, examples of the above embodiment are described.

Example 1 (Horizontal Photo-Alignment Film: Copolymer)

(Production of Liquid Crystal Cell)

A TFT substrate and a counter substrate with no electrode were prepared. To each of the substrates was applied a polyamic acid-based alignment film material that is represented by the following formula (19) and contains a copolymer containing azobenzene as a photo-functional group and an alkyl group as a hydrophobic group. The film material was pre-baked at 80° C. for two minutes, irradiated with linearly polarized light (including ultraviolet light having a wavelength of 310 to 370 nm) with an intensity of 2 J/cm², and then post-baked at 110° C. for 20 minutes and then at 230° C. for 20 minutes, whereby photo-alignment films were formed. To one of the substrates was applied an ultraviolet-curable, thermosetting sealant (trade name: Photolec S, Sekisui Chemical Co., Ltd.) in a predetermined pattern using a dispenser. Onto the predetermined positions of the other substrate was dropped a positive liquid crystal material A (viscosity: 65 mPa·s (20° C.), measured with a liquid crystal material characteristics measurement system from Toyo Corp.) having a Tni of 75° C. or lower and a liquid crystal phase temperature range narrower than 100° C. The substrates were bonded to each other in a vacuum, and the sealant was cured by ultraviolet light (including ultraviolet light having a wavelength of 300 to 400 nm). The substrates were further heated at 130° C. for 40 minutes to thermally cure the sealant, and subjected to realignment treatment such that the liquid crystal transformed into an isotropic phase. The substrates were cooled down to room temperature, and thereby an FFS-mode liquid crystal cell was obtained.

[Chem. 19]

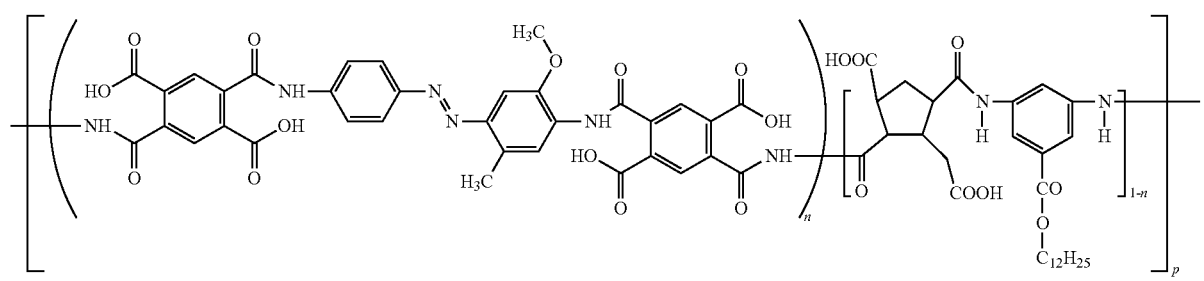

(19)

In the formula, n is 0.8 and p shows the degree of polymerization.

Comparative Example 1

An FFS-mode liquid crystal cell of Comparative Example 1 was produced using a polyamic acid (containing only an azobenzene group and no alkyl group) represented by the following formula (20):

[Chem. 20]

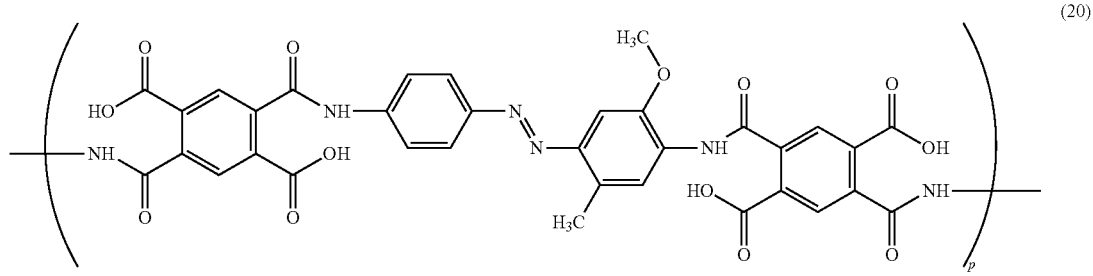

(20)

wherein p shows the degree of polymerization.

Comparative Example 2

In Comparative Example 2, the alignment film material contained a copolymer represented by the formula (19), and the liquid crystal material used was a positive liquid crystal material B (viscosity: 95 mPa·s (20° C.), measured with a liquid crystal material characteristics measurement system from Toyo Corp.) having a Tni of 80° C. and a liquid crystal (nematic) phase temperature range of 100.5° C. or wider.
(Electro-Optical Characteristics and Response Performance at 25° C.)
The electro-optical characteristics (VT characteristics) and response performance of the liquid crystal cell were determined at a cell surface temperature of 25° C. using Photoal from Otsuka Electronics Co., Ltd.
(Low-Temperature Storage Test)
The liquid crystal cell was placed in a −20° C. thermostat bath and left to stand for 1000 hours to determine whether or not crystallization occurred.

FIG. 1 is a graph showing the normalized transmittance (%) versus voltage (V) in liquid crystal display devices of Example 1 and Comparative Examples 1 and 2. The results in FIG. 1 confirm that there is no significant difference in VT characteristics between Example 1 and Comparative Examples 1 and 2. The results also confirm that a photo-alignment film polymer containing a hydrophobic group does not affect the VT characteristics.

Table 1 shows the results of the response performance (sum of rise response τr and decay response τd) at 25° C. and crystallization during the −20° C. storage test (1000 hours).

TABLE 1

| | Response performance τr + τd (ms) (25° C.) | Crystallization during −20° C. storage test (1000 hours) |
| --- | --- | --- |
| Example 1 | 14.5 | Not occurred |
| Comparative Example 1 | 14.6 | Occurred |
| Comparative Example 2 | 22.3 | Not occurred |

In Comparative Example 1, the response performance did not differ from that in Example 1 but crystallization occurred in the −20° C. storage test. The liquid crystal material crystallized presumably because the liquid crystal layer, containing no alkyl group (hydrophobic group) on its surface, was less likely to interact with liquid crystal molecules in the liquid crystal layer, and thus failed to weaken the strong p orbital electron interaction between the phenyl groups or the phenylene groups in the liquid crystal molecules.

In Comparative Example 2, crystallization did not occur in the −20° C. storage test, but the response performance was degraded. Since the liquid crystal material B was used, the viscosity was high and the response performance was low.

The results in Table 1 confirm that with a photo-alignment film polymer containing a hydrophobic group, excellent response performance was achieved using a liquid crystal material having a Tni of 75° C. or lower and a liquid crystal phase temperature range narrower than 100° C. while crystallization was reduced or avoided during low-temperature storage.

Example 2 (Introduction of Low-Molecular-Weight Additive Containing Hydrophobic Group into Horizontal Alignment Film)

(Production of Liquid Crystal Cell)
A TFT substrate and a counter substrate with no electrode were prepared. To each of the substrates was applied an alignment film material that contained a polyamic acid represented by the formula (20) and containing a photo-functional group (azobenzene) and a compound represented by the following formula (21) or a compound represented by the following formula (22). The film material was pre-baked at 80° C. for two minutes, irradiated with linearly polarized light (including ultraviolet light having a wavelength of 310 to 370 nm) with an intensity of 2 J/cm², and then post-baked at 110° C. for 20 minutes and then at 230° C. for 20 minutes, whereby photo-alignment films were formed. The case of using an alignment film material containing a compound represented by the following formula (21) is Example 2-1, and the case of using an alignment film material containing a compound represented by the following formula (22) is Example 2-2. To one of the substrates was applied an ultraviolet-curable, thermosetting sealant (trade name: Photolec S, Sekisui Chemical Co., Ltd.) in a predetermined pattern using a dispenser. Onto the predetermined positions of the other substrate was dropped a positive liquid crystal material A having a Tni of 75° C. or lower and a liquid crystal phase temperature range narrower than 100° C. The substrates were bonded to each other in a vacuum, and the sealant was cured by ultraviolet light (including ultraviolet light having a wavelength of 300 to 400 nm). The substrates were further heated at 130° C. for 40 minutes to thermally cure the sealant, and subjected to realignment treatment such that the liquid crystal transformed into an isotropic phase. The substrates were cooled down to room temperature, and thereby an FFS-mode liquid crystal cell was obtained.

[Chem. 21]

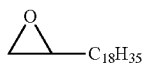

(21)

[Chem. 22]

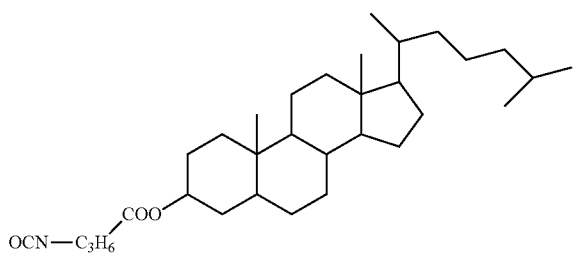

(22)

(Electro-Optical Characteristics and Response Performance at 25° C.)

Determination was conducted as in Example 1.

(Low-Temperature Storage Test)

Determination was conducted as in Example 1.

Figure 2:
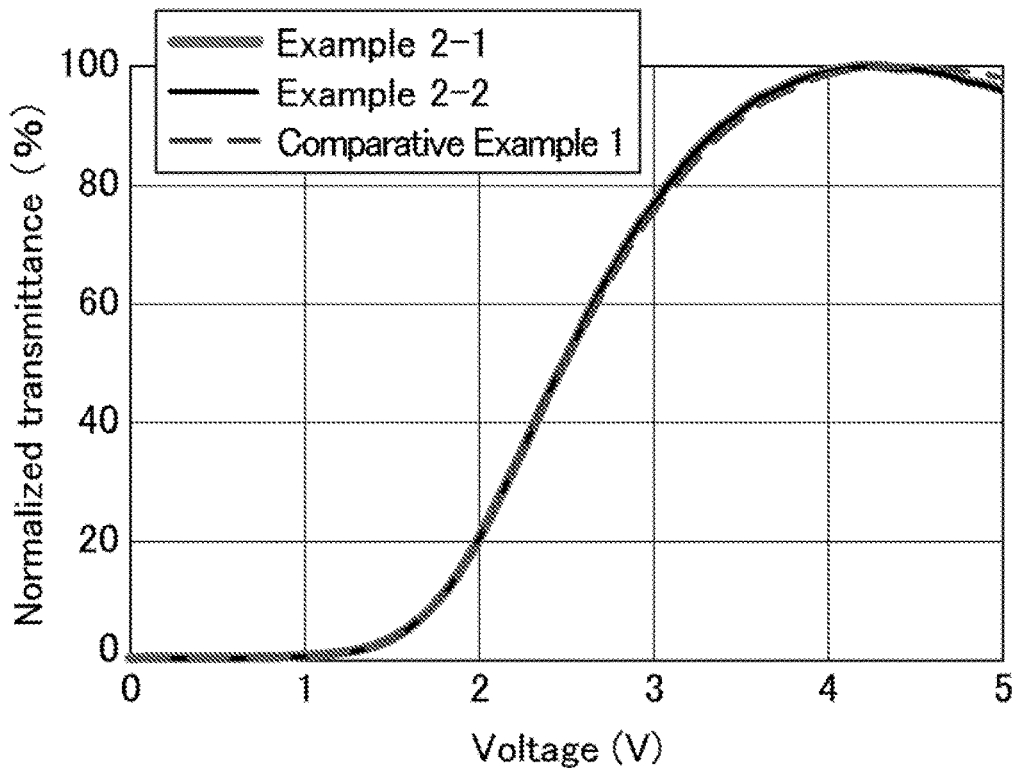
FIG. 2 is a graph showing the normalized transmittance (%) versus voltage (V) in liquid crystal display devices of Examples 2-1 and 2-2 and Comparative Example 1.

FIG. 2 is a graph showing the normalized transmittance (%) versus voltage (V) in liquid crystal display devices of Examples 2-1 and 2-2 and Comparative Example 1.

Table 2 shows the results of the response performance (sum of rise response τr and decay response τd) at 25° C. and crystallization during the −20° C. storage test (1000 hours).

TABLE 2

| | Response performance τr + τd (ms) (25° C.) | Crystallization during −20° C. storage test (1000 hours) |
|---|---|---|
| Example 2-1 | 14.5 | Not occurred |
| Example 2-2 | 14.5 | Not occurred |
| Comparative Example 1 | 14.6 | Occurred |

The results in FIG. 2 and Table 2 confirm that crystallization during low-temperature storage can be reduced or avoided also by adding a compound containing a hydrophobic group.

Example 3 (Introduction of Polymeric Additive Containing Hydrophobic Group into Horizontal Alignment Film)

(Production of Liquid Crystal Cell)

A TFT substrate and a counter substrate with no electrode were prepared. To each of the substrates was applied an alignment film material that contained a polyamic acid containing a photo-functional group (azobenzene) and represented by the formula (20) and a polymeric additive represented by the following formula (23) or a polymeric additive represented by the following formula (24). The film material was pre-baked at 80° C. for two minutes, irradiated with linearly polarized light (including ultraviolet light having a wavelength of 310 to 370 nm) with an intensity of 2 J/cm², and then post-baked at 110° C. for 20 minutes and then at 230° C. for 20 minutes, whereby photo-alignment films were formed. The case of using an alignment film material containing a polymeric additive represented by the following formula (23) is Example 3-1, and the case of using an alignment film material containing a polymeric additive represented by the following formula (24) is Example 3-2. To one of the substrates was applied an ultraviolet-curable, thermosetting sealant (trade name: Photolec S, Sekisui Chemical Co., Ltd.) in a predetermined pattern using a dispenser. Onto the predetermined positions of the other substrate was dropped a positive liquid crystal material A having a Tni of 75° C. or lower and a liquid crystal phase temperature range narrower than 100° C. The substrates were bonded to each other in a vacuum, and the sealant was cured by ultraviolet light (including ultraviolet light having a wavelength of 300 to 400 nm). The substrates were further heated at 130° C. for 40 minutes to thermally cure the sealant, and subjected to realignment treatment such that the liquid crystal transformed into an isotropic phase. The substrates were cooled down to room temperature, and thereby an FFS-mode liquid crystal cell was obtained.

[Chem. 23]

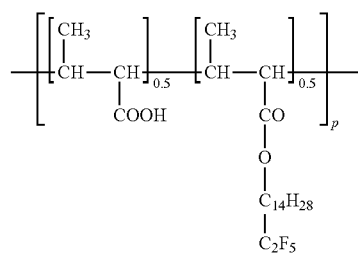

(23)

[Chem. 24]

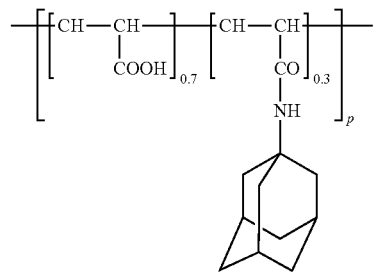

(24)

In the formulas, p shows the degree of polymerization.

(Electro-Optical Characteristics and Response Performance at 25° C.)

Determination was conducted as in Example 1.

(Low-Temperature Storage Test)

Determination was conducted as in Example 1.

Figure 3:
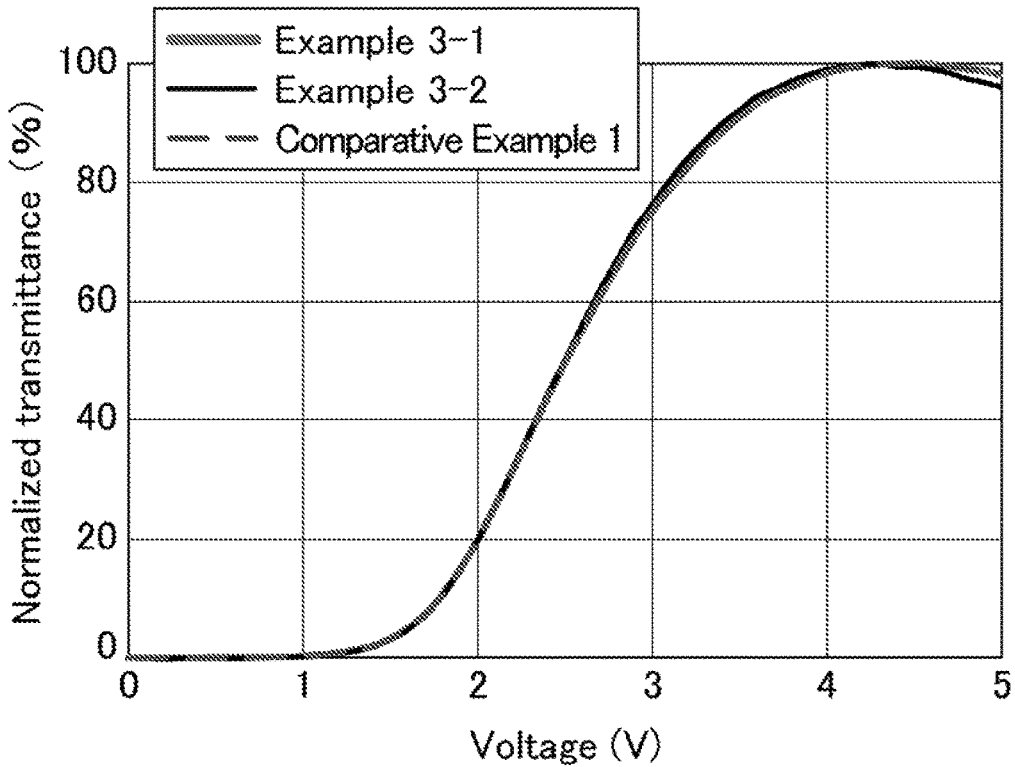
FIG. 3 shows the normalized transmittance (%) versus voltage (V) in liquid crystal display devices of Examples 3-1 and 3-2 and Comparative Example 1.

FIG. 3 shows the normalized transmittance (%) versus voltage (V) in liquid crystal display devices of Examples 3-1 and 3-2 and Comparative Example 1.

Table 3 shows the results of the response performance (sum of rise response τr and decay response τd) at 25° C. and crystallization during the −20° C. storage test (1000 hours).

TABLE 3

|  | Response performance τr + τd (ms) (25° C.) | Crystallization during −20° C. storage test (1000 hours) |
| --- | --- | --- |
| Example 3-1 | 14.6 | Not occurred |
| Example 3-2 | 14.7 | Not occurred |
| Comparative Example 1 | 14.6 | Occurred |

The results in FIG. 3 and Table 3 confirm that crystallization during low-temperature storage can be reduced or avoided also by adding a polymeric additive containing a hydrophobic group.

Example 4 (Introduction of Polymer Containing Hydrophobic Group into Horizontal Alignment Film, Followed by Polymerization)

A TFT substrate and a counter substrate with no electrode were prepared. To each of the substrates was applied an alignment film material containing a polysiloxane with a photo-functional group (cinnamate group) and represented by the following formula (25), a monomer containing a hydrophobic group and represented by the following formula (26) or a monomer containing a hydrophobic group and represented by the following formula (27), and a thermal polymerization initiator represented by the following formula (28). The film material was pre-baked at 60° C. for two minutes, and then thermally polymerized at 80° C. for 30 minutes. The case of using an alignment film material that contains a monomer containing a hydrophobic group and represented by the following formula (26) is Example 4-1, and the case of using an alignment film material that contains a monomer containing a hydrophobic group and represented by the following formula (27) is Example 4-2. The film material was irradiated with linearly polarized light (including ultraviolet light having a wavelength of 310 to 370 nm) with an intensity of 100 mJ/cm², and then post-baked at 200° C. for 40 minutes, whereby photo-alignment films were formed. To one of the substrates was applied an ultraviolet-curable, thermosetting sealant (trade name: Photolec S, Sekisui Chemical Co., Ltd.) in a predetermined pattern using a dispenser. Onto the predetermined positions of the other substrate was dropped a positive liquid crystal material A having a Tni of 75° C. or lower and a liquid crystal phase temperature range narrower than 100° C. The substrates were bonded to each other in a vacuum, and the sealant was cured by ultraviolet light (including ultraviolet light having a wavelength of 300 to 400 nm). The substrates were further heated at 130° C. for 40 minutes to thermally cure the sealant, and subjected to realignment treatment such that the liquid crystal transformed into an isotropic phase. The substrates were cooled down to room temperature, and thereby an FFS-mode liquid crystal cell was obtained.

[Chem. 25]

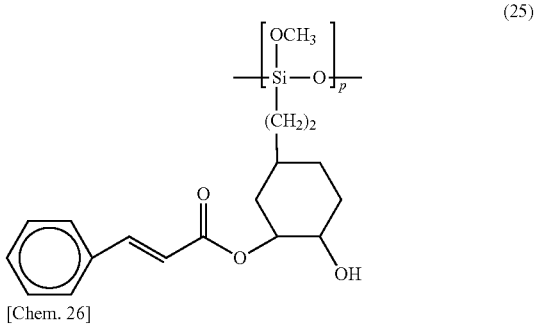

(25)

[Chem. 26]

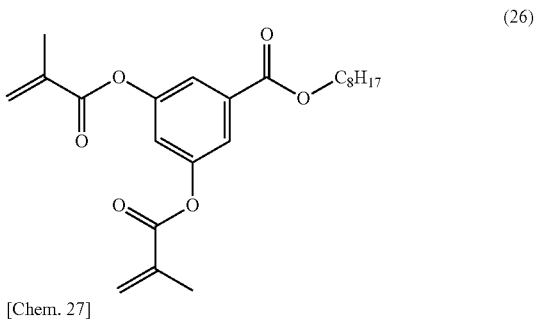

(26)

[Chem. 27]

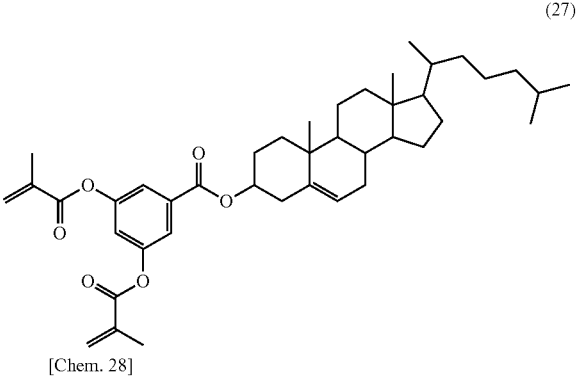

(27)

[Chem. 28]

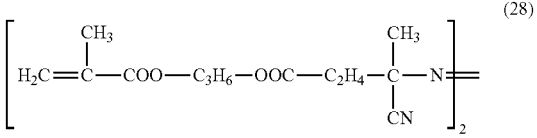

(28)

Comparative Example 3

In Comparative Example 3, an FFS-mode liquid crystal cell was obtained as in Example 4-1 (Example 4-2), except that an alignment film material containing only polysiloxane containing a photo-functional group and represented by the formula (25) was used.

(Electro-Optical Characteristics and Response Performance at 25° C.)

Determination was conducted as in Example 1.

(Low-Temperature Storage Test)

Determination was conducted as in Example 1.

Figure 4:
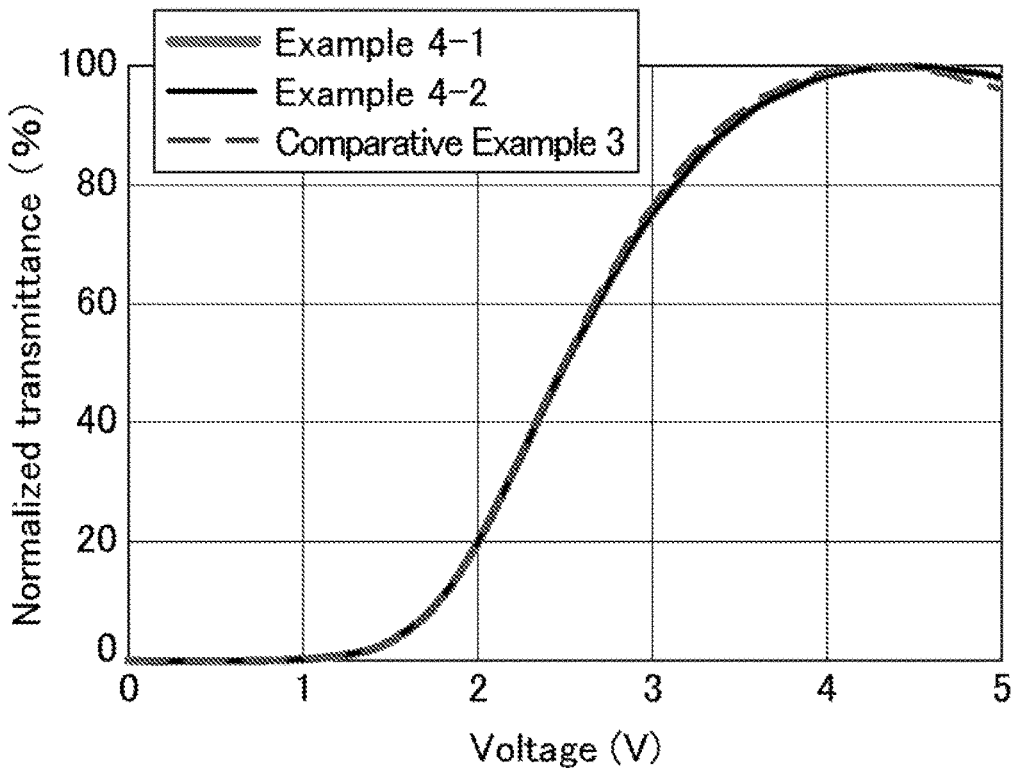
FIG. 4 shows the normalized transmittance (%) versus voltage (V) in liquid crystal display devices of Examples 4-1 and 4-2 and Comparative Example 3.

FIG. 4 shows the normalized transmittance (%) versus voltage (V) in liquid crystal display devices of Examples 4-1 and 4-2 and Comparative Example 3.

Table 4 shows the results of the response performance (sum of rise response τr and decay response τd) at 25° C. and crystallization during the −20° C. storage test (1000 hours).

TABLE 4

|  | Response performance τr + τd (ms) (25° C.) | Crystallization during −20° C. storage test (1000 hours) |
|---|---|---|
| Example 4-1 | 14.7 | Not occurred |
| Example 4-2 | 14.6 | Not occurred |
| Comparative Example 3 | 14.7 | Occurred |

The results in FIG. 4 and Table 4 confirm that crystallization during low-temperature storage can be reduced or avoided also by adding a monomer containing a hydrophobic group to a photo-alignment film polymer and polymerizing the monomer in the alignment film using a thermal polymerization initiator to obtain another polymer.

The concept of the present invention is applicable to ECB-mode, TN-mode, or vertical alignment TN (VATN)-mode liquid crystal display devices, for example.

ADDITIONAL REMARKS

Preferred aspects of the liquid crystal display device of the present invention and the method for manufacturing the liquid crystal display device. In other words, the preferred examples described below, as well as the preferred examples described above, are examples of preferred aspects of the present invention. These examples may appropriately be combined within the spirit of the present invention.

Figure 5:
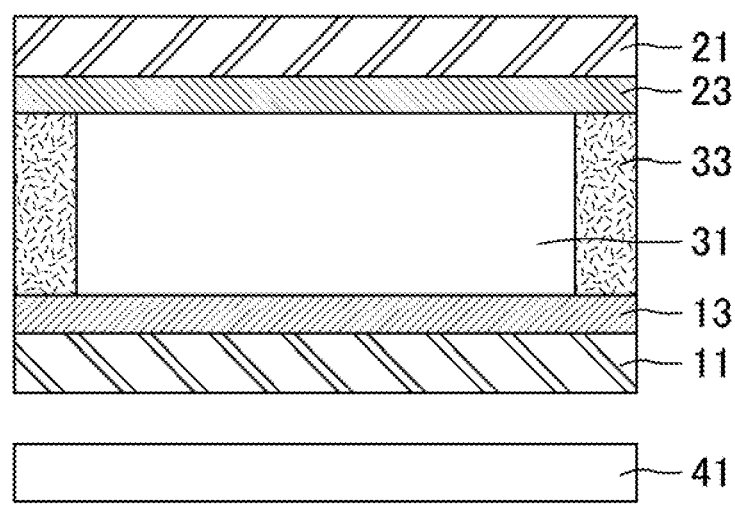
FIG. 5 is a schematic cross-sectional view of the liquid crystal display device of the present invention.

FIG. 5 is a schematic cross-sectional view of the liquid crystal display device of the present invention. As shown in FIG. 5, the liquid crystal display device includes a lower glass substrate 11, an upper glass substrate 21 facing the lower glass substrate 11, a liquid crystal layer 31 and a seal 33 disposed between the substrates, and alignment films 13 and 23. The alignment film 13 is disposed between the lower glass substrate 11 and the liquid crystal layer 31. The alignment film 23 is disposed between the upper glass substrate 21 and the liquid crystal layer 31. The seal 33 seals the liquid crystal layer 31. In the case where the liquid crystal display device is a transmissive liquid crystal display device or a transflective liquid crystal display device, the liquid crystal display device further includes a backlight 41 under (behind) the lower glass substrate 11. The liquid crystal display device may further include paired polarizers on the surfaces of the respective lower glass substrate 11 and upper glass substrate 21 remote from the liquid crystal layer 31.

The liquid crystal display device of the present invention also includes components such as thin-film transistor elements appropriately disposed on the lower glass substrate 11, which functions as a support substrate. The liquid crystal display device of the present invention includes, for example, pixel electrodes provided with slits on part of an insulating film that covers components such as thin-film transistor elements, and a common electrode disposed on the upper glass substrate 21, which functions as a support substrate. The material of the pixel electrode and the common electrode is preferably indium tin oxide (ITO) or indium zinc oxide (IZO). The liquid crystal display device of the present invention further includes a color filter layer (which may be disposed in the same layer as the black matrix) appropriately disposed on the upper glass substrate 21, for example. In this case, the paired substrate can be regarded as consisting of a TFT array substrate (TFT substrate) and a color filter substrate (counter substrate). Components such as a color filter layer may be disposed on the lower glass substrate 11, not on the upper glass substrate 21.

One aspect of the present invention may be a liquid crystal display device including: paired substrates; a liquid crystal layer held between the substrates; and a photo-alignment film disposed on a surface facing the liquid crystal layer of at least one of the substrates, the liquid crystal layer containing a liquid crystal material that has a nematic-isotropic phase transition temperature of 75° C. or lower and a nematic phase temperature range narrower than 100° C., the photo-alignment film containing a polymer, the polymer and/or another component of the photo-alignment film containing a hydrophobic group. The hydrophobic group is a C1 or greater hydrocarbon group, and is preferably, for example, an aliphatic group such as an alkyl group or an alkylene group. The aliphatic group such as an alkyl group or an alkylene group is linear or cyclic. The aliphatic group is saturated or unsaturated.

The hydrophobic group (preferably an aliphatic group) is preferably a C2 or greater one, more preferably a C5 or greater one, still more preferably a C8 or greater one, particularly preferably a C13 or greater one. There is no upper limit of the number of carbons, but the upper limit is preferably 30, for example.

In the liquid crystal display device of the present invention, a main chain of the polymer preferably has a polyamic acid structure or a polysiloxane structure.

In the liquid crystal display device of the present invention, the polymer preferably has an azobenzene structure or contains a cinnamate group.

In the liquid crystal display device of the present invention, the polymer preferably contains a hydrophobic group. The expression "the polymer contains a hydrophobic group" means that a hydrophobic group has been introduced into the polymer by a chemical bond.

The other components in the photo-alignment film may be any components such as a polymer other than the above polymer or a low-molecular-weight compound. For example, in the liquid crystal display device of the present invention, the photo-alignment film preferably contains a compound containing the hydrophobic group.

In the liquid crystal display device of the present invention, the compound is preferably represented by, for example, the following formula (10-1):

[Chem. 29-1]

$$S\text{-}A^2\text{-}Z^4\text{-}L^3 \qquad (10\text{-}1)$$

wherein S is represented by any one of the following formulas (10-2) to (10-6); $A^2$ represents a divalent hydrocarbon group or a direct bond; the —$Z^4$— group represents a —O— group, a —S— group, a —NH— group, a —CO— group, a —COO— group, a —OCO— group, a —NHCO— group, a —CONH— group, or a direct bond; $L^3$ represents a C4 or greater alkyl, alkenyl, or aralkyl group, or a C4 or greater monovalent monocyclic or polycyclic hydrocarbon group; the alkyl group and the alkenyl group may each be linear or branched; at least one hydrogen atom in each of the aralkyl group and the monovalent monocyclic or polycyclic hydrocarbon group may be replaced by a C1 to C8 linear or branched alkyl or alkenyl group; a —$CH_2$— group in each of the alkyl group, the alkenyl group, and the monovalent monocyclic or polycyclic hydrocarbon group may be replaced by a —O— group, a —CO— group, a —COO— group, or a —OCO— group unless oxygen atoms neighbor each other; and the divalent hydrocarbon group in $A^2$ is, for example, an alicyclic hydrocarbon group, an aromatic monocyclic hydrocarbon group, or an aromatic condensed polycyclic hydrocarbon group,

[Chem. 29-2]

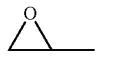 (10-2)

(OMe)$_3$Si— (10-3)

(OEt)$_3$Si— (10-4)

Cl$_3$Si— (10-5)

OCN— (10-6)

wherein Me represents a methyl group and Et represents an ethyl group.

The compound is preferably represented by, for example, the following formula (11-1):

[Chem. 30-1]

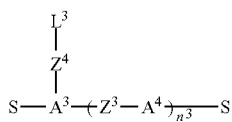 (11-1)

wherein S's are the same as or different from each other and each represented by any one of the following formulas (11-2) to (11-6); $A^3$ represents a trivalent hydrocarbon group; $A^4$ represents a phenylene group; a —CH$_2$— group in each of $A^3$ and $A^4$ may be replaced by a —O— group or a —S— group unless the —CH$_2$— group neighbors another one; a —CH= group in each of $A^3$ and $A^4$ may be replaced by a —N= group unless the —CH= group neighbors another one; a hydrogen atom in each of $A^3$ and $A^4$ may be replaced by a fluorine atom, a chlorine atom, a —CN group, or a C1 to C12 alkyl, alkoxy, alkylcarbonyl, alkoxycarbonyl, or alkylcarbonyloxy group, and at least one of their carbon atoms may be replaced by a silicon atom; the alkyl, alkoxy, alkylcarbonyl, alkoxycarbonyl, or alkylcarbonyloxy group may be linear or branched; the —$Z^3$— group and the —$Z^4$— group are the same as or different from each other and each represent a —O— group, a —S— group, a —NH— group, a —CO— group, a —COO— group, a —OCO— group, a —NHCO— group, a —CONH— group, or a direct bond; $L^3$ represents a C4 or greater alkyl, alkenyl, or aralkyl group or a C4 or greater monovalent monocyclic or polycyclic hydrocarbon group; the alkyl group and the alkenyl group may each be linear or branched; at least one hydrogen atom in each of the aralkyl group and the monovalent monocyclic or polycyclic hydrocarbon group may be replaced by a C1 to C8 linear or branched alkyl or alkenyl group; a —CH$_2$— group in each of the alkyl group, the alkenyl group, and the monovalent monocyclic or polycyclic hydrocarbon group may be replaced by a —O— group, a —CO— group, a —COO— group, or a —OCO— group unless oxygen atoms neighbor each other; $n^3$ is 0 or 1; and the trivalent hydrocarbon group in $A^3$ is, for example, an alicyclic hydrocarbon group, an aromatic monocyclic hydrocarbon group, or an aromatic condensed polycyclic hydrocarbon group,

[Chem. 30-2]

 (11-2)

(OMe)$_3$Si— (11-3)

(OEt)$_3$Si— (11-4)

Cl$_3$Si— (11-5)

OCN— (11-6)

wherein Me represents a methyl group and Et represents an ethyl group.

In the liquid crystal display device of the present invention, preferably, with the polymer taken as a first polymer, the photo-alignment film further contains a second polymer other than the first polymer, and the second polymer contains a hydrophobic group.

In the liquid crystal display device of the present invention, the second polymer is preferably represented by the following formula (14):

[Chem. 31]

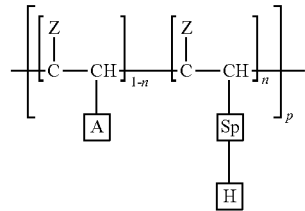 (14)

wherein H surrounded by a solid line represents a C4 or greater alkyl, alkenyl, or aralkyl group or a C4 or greater monovalent monocyclic or polycyclic hydrocarbon group; A represents a hydrogen atom, an OH group, a COOH group, or a NH$_2$ group; a -Sp- group represents a —O— group, a —S— group, a —NH— group, a —CO— group, a —COO— group, a —OCO— group, a —NHCO— group, a —CONH— group, or a direct bond; Z represents a hydrogen atom, a CH$_3$ group, or a C$_2$H$_5$ group; p shows the degree of polymerization and is an integer of 1 or greater; and n is any value falling within the range of 0 to 1.

In the liquid crystal display device of the present invention, preferably, the second polymer is preferably a polymer containing a monomer unit derived from a monomer represented by the following formula (17):

[Chem. 32]

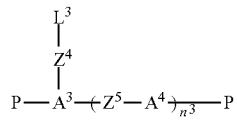 (17)

wherein P's are the same as or different from each other and each represent an acryloyloxy group, a methacryloyloxy group, an acryloylamino group, or a methacryloylamino group; $A^3$ represents a trivalent hydrocarbon group; $A^4$ represents a phenylene group; a —$CH_2$— group in each of $A^3$ and $A^4$ may be replaced by a —O— group or a —S— group unless the —$CH_2$— group neighbors another one; a —CH= group in each of $A^3$ and $A^4$ may be replaced by a —N= group unless the —CH= group neighbors another one; a hydrogen atom in each of $A^3$ and $A^4$ may be replaced by a fluorine atom, a chlorine atom, a —CN group, or a C1 to C12 alkyl, alkoxy, alkylcarbonyl, alkoxycarbonyl, or alkylcarbonyloxy group, and at least one of their carbon atoms may be replaced by a silicon atom; the alkyl, alkoxy, alkylcarbonyl, alkoxycarbonyl, or alkylcarbonyloxy group may be linear or branched; the —$Z^4$— group and the —$Z^5$— group are the same as or different from each other and each represent a —O— group, a —S— group, a —NH— group, a —CO— group, a —COO— group, a —OCO— group, a —NHCO— group, a —CONH— group, or a direct bond; $L^3$ represents a C4 or greater alkyl, alkenyl, or aralkyl group or a C4 or greater monovalent monocyclic or polycyclic hydrocarbon group; the alkyl group and the alkenyl group may be linear or branched; at least one hydrogen atom in each of the aralkyl group and the monovalent monocyclic or polycyclic hydrocarbon group may be replaced by a C1 to C8 linear or branched alkyl or alkenyl group; a —$CH_2$— group in each of the alkyl group, the alkenyl group, and the monovalent monocyclic or polycyclic hydrocarbon group may be replaced by a —O— group, a —CO— group, a —COO— group, or a —OCO— group unless oxygen atoms neighbor each other; and $n^3$ is 0 or 1.

The trivalent hydrocarbon group in $A^3$ is, for example, an alicyclic hydrocarbon group, an aromatic monocyclic hydrocarbon group, or an aromatic condensed polycyclic hydrocarbon group.

Another aspect of the present invention may be a method for manufacturing the liquid crystal display device of the present invention, the method including: heating an alignment film material that contains an additive containing the hydrophobic group so as to produce the polymer containing the hydrophobic group.

The heating temperature is preferably, for example, 100° C. or higher, more preferably 150° C. or higher. The upper limit of the heating temperature may be any temperature such as 300° C.

The heating duration is, for example, preferably 10 minutes or longer, more preferably 20 minutes or longer. The upper limit of the heating duration may be any length such as 100 minutes.

Pre-baking may be conducted before post-baking.

Yet another aspect of the present invention may be a method for manufacturing the liquid crystal display device of the present invention, the method including: radically polymerizing the monomer using a radical polymerization initiator to produce the second polymer.

In the method for manufacturing the liquid crystal display device of the present invention, the radical polymerization initiator is preferably an azo-based thermal radical polymerization initiator.

The display mode of the liquid crystal display device of the present invention is preferably the twisted nematic (TN) mode, the electrically controlled birefringence (EBC) mode, the IPS mode, the FFS mode, the VA mode, or the VATN mode. The liquid crystal display device of the present invention may be a transmissive liquid crystal display device, a reflective liquid crystal display device, or a transflective liquid crystal display device. In the case where the liquid crystal display device of the present invention is a transmissive liquid crystal display device or a transflective liquid crystal display device, the liquid crystal display device of the present invention usually includes a backlight.

REFERENCE SIGNS LIST

11: Lower glass substrate
13, 23: Alignment film
21: Upper glass substrate
31: Liquid crystal layer
33: Seal
41: Backlight

The invention claimed is:
1. A liquid crystal display device comprising:
paired substrates;
a liquid crystal layer held between the substrates; and
a photo-alignment film disposed on a surface facing the liquid crystal layer of at least one of the substrates,
the liquid crystal layer containing a liquid crystal material that has a nematic-isotropic phase transition temperature of 75° C. or lower and a nematic phase temperature range narrower than 100° C.,
the photo-alignment film containing a first polymer and a first compound each containing a hydrophobic group,
wherein the first polymer includes a polyamic acid represented by the following formula (20):

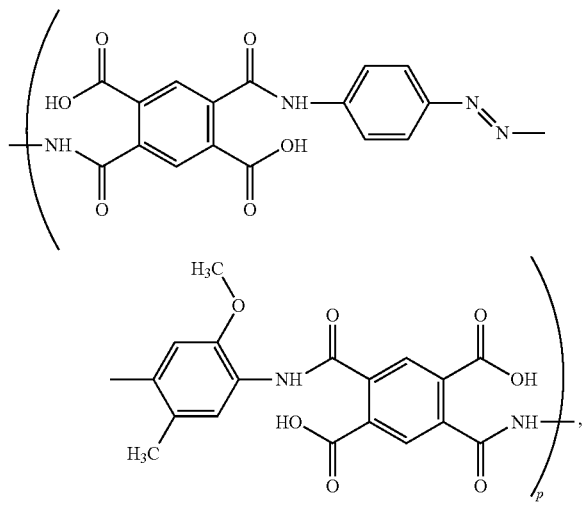

(20)

and the first compound is represented by the following formula (21):

(21)

△—$C_{18}H_{35}$.

2. A liquid crystal display device comprising:
paired substrates;
a liquid crystal layer held between the substrates; and
a photo-alignment film disposed on a surface facing the liquid crystal layer of at least one of the substrates, the liquid crystal layer containing a liquid crystal material that has a nematic-isotropic phase transition temperature of 75° C. or lower and a nematic phase temperature range narrower than 100° C., the photo-alignment film containing a first polymer and a first compound each containing a hydrophobic group, wherein the first polymer includes a polyamic acid represented by the following formula (20):

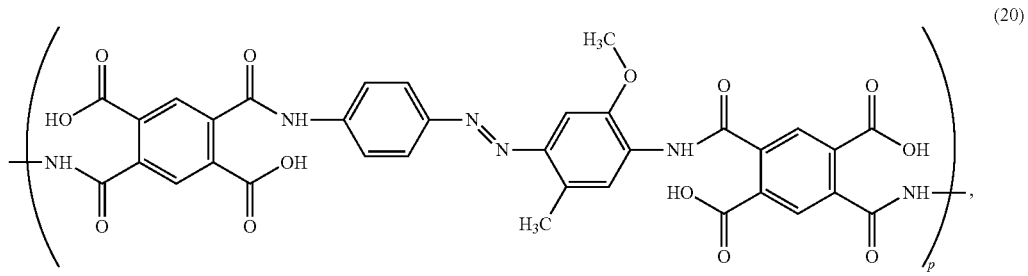

and the first compound is represented by the following formula (22):

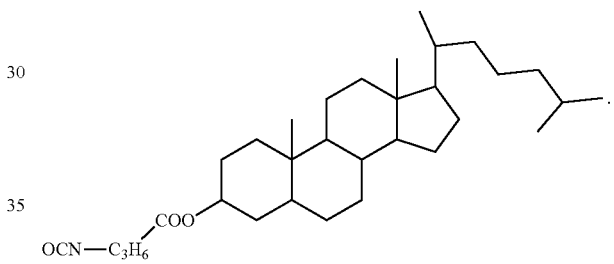

3. A liquid crystal display device comprising:
paired substrates;
a liquid crystal layer held between the substrates; and
a photo-alignment film disposed on a surface facing the liquid crystal layer of at least one of the substrates,
the liquid crystal layer containing a liquid crystal material that has a nematic-isotropic phase transition temperature of 75° C. or lower and a nematic phase temperature range narrower than 100° C.,
the photo-alignment film containing a copolymer of a first monomer unit containing a photo-functional group and a second monomer unit containing a hydrophobic group, wherein the copolymer is represented by the following formula (19):

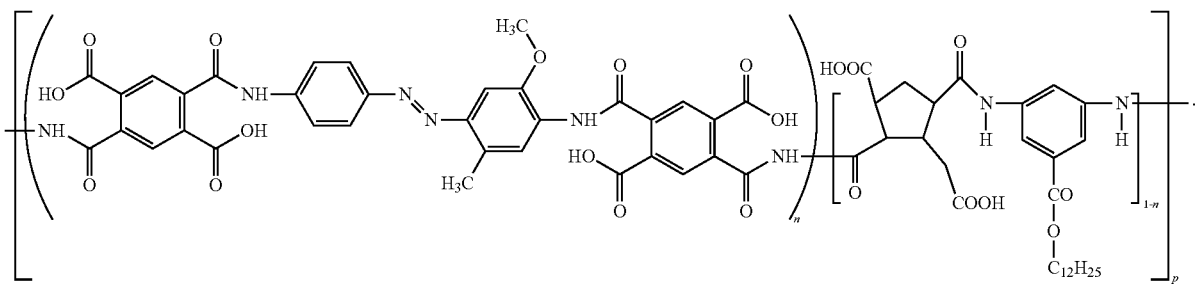

4. The liquid crystal display device according to claim 3, wherein the photo-alignment film includes a polysiloxane with a photo-functional group and represented by the following formula (25):

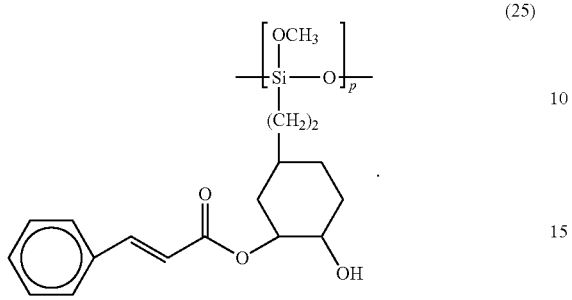

(25)

5. The liquid crystal display device according to claim 3, wherein the photo-alignment film further contains a second polymer, and
the second polymer contains a hydrophobic group.

6. The liquid crystal display device according to claim 5, wherein the second polymer is represented by the following formula (14):

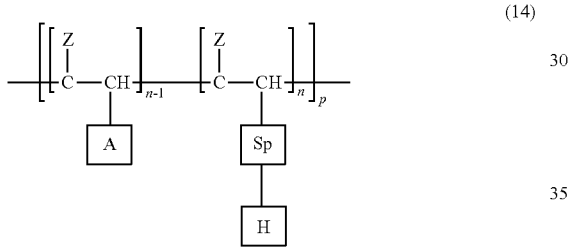

(14)

wherein H surrounded by a solid line represents a C4 or greater alkyl, alkenyl, or aralkyl group or a C4 or greater monovalent monocyclic or polycyclic hydrocarbon group; A represents a hydrogen atom, an OH group, a COOH group, or a NH$_2$ group; a -Sp- group represents a —O— group, a —S— group, a —NH— group, a —CO— group, a —COO— group, a —OCO— group, a —NHCO— group, a —CONH— group, or a direct bond; Z represents a hydrogen atom, a CH$_3$ group, or a C$_2$H$_5$ group; p shows the degree of polymerization and is an integer of 1 or greater; and n is any value falling within the range of 0 to 1.

7. The liquid crystal display device according to claim 6, wherein the second polymer is represented by the following formula (23) or (24):

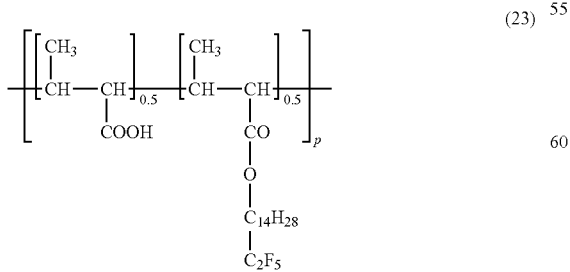

(23)

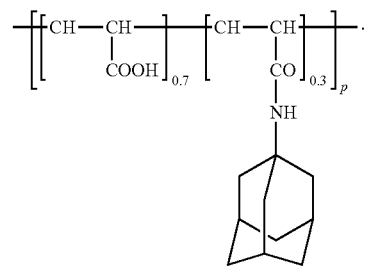

(24)

8. The liquid crystal display device according to claim 5, wherein the second polymer is a polymer containing a monomer unit derived from a monomer represented by the following formula (17):

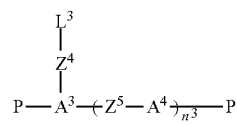

(17)

wherein P's are the same as or different from each other and each represent an acryloyloxy group, a methacryloyloxy group, an acryloylamino group, or a methacryloylamino group; A3 represents a trivalent hydrocarbon group; A4 represents a phenylene group; a —CH$_2$— group in each of A3 and A4 may be replaced by a —O— group or a —S— group unless the —CH$_2$— group neighbors another one; a —CH= group in each of A3 and A4 may be replaced by a —N= group unless the —CH= group neighbors another one; a hydrogen atom in each of A3 and A4 may be replaced by a fluorine atom, a chlorine atom, a —CN group, or a C1 to C12 alkyl, alkoxy, alkylcarbonyl, alkoxycarbonyl, or alkylcarbonyloxy group, and at least one of their carbon atoms may be replaced by a silicon atom; the alkyl, alkoxy, alkylcarbonyl, alkoxycarbonyl, or alkylcarbonyloxy group may be linear or branched; the —Z4— group and the —Z5— group are the same as or different from each other and each represent a —O— group, a —S— group, a —NH— group, a —CO— group, a —COO— group, a —OCO— group, a —NHCO— group, a —CONH— group, or a direct bond; L3 represents a C4 or greater alkyl, alkenyl, or aralkyl group or a C4 or greater monovalent monocyclic or polycyclic hydrocarbon group; the alkyl group and the alkenyl group may be linear or branched; at least one hydrogen atom in each of the aralkyl group and the monovalent monocyclic or polycyclic hydrocarbon group may be replaced by a C1 to C8 linear or branched alkyl or alkenyl group; a —CH$_2$— group in each of the alkyl group, the alkenyl group, and the monovalent monocyclic or polycyclic hydrocarbon group may be replaced by a —O— group, a —CO— group, a —COO— group, or a —OCO— group unless oxygen atoms neighbor each other; and n3 is 0 or 1.

* * * * *